United States Patent
Schwerdtner et al.

(10) Patent No.: US 8,526,088 B2
(45) Date of Patent: *Sep. 3, 2013

(54) DEVICE FOR HOLOGRAPHIC RECONSTRUCTION OF THREE-DIMENSIONAL SCENES

(75) Inventors: Armin Schwerdtner, Dresden (DE); Ralf Haussler, Dresden (DE); Norbert Leister, Dresden (DE)

(73) Assignee: Seereal Technologies GmbH, Dresden (DE)

( * ) Notice: Subject to any disclaimer, the term of this patent is extended or adjusted under 35 U.S.C. 154(b) by 247 days.

This patent is subject to a terminal disclaimer.

(21) Appl. No.: 12/467,598

(22) Filed: May 18, 2009

(65) Prior Publication Data

US 2009/0225380 A1    Sep. 10, 2009

Related U.S. Application Data

(62) Division of application No. 11/418,946, filed on May 5, 2006, now Pat. No. 7,535,607.

(30) Foreign Application Priority Data

May 6, 2005 (DE) .................. 10 2005 022 658

(51) Int. Cl.
*G03H 1/08* (2006.01)
*G02B 5/32* (2006.01)

(52) U.S. Cl.
USPC .................... 359/9; 359/15; 359/23

(58) Field of Classification Search
USPC .................... 359/9, 23, 32
See application file for complete search history.

(56) References Cited

U.S. PATENT DOCUMENTS

| | | | |
|---|---|---|---|
| 4,920,385 A * | 4/1990 | Clarke et al. | 356/237.2 |
| 5,194,971 A | 3/1993 | Haines | |
| 5,561,537 A * | 10/1996 | Aritake et al. | 359/23 |
| 5,930,012 A * | 7/1999 | Mears et al. | 359/15 |
| 6,304,288 B1 * | 10/2001 | Hamagishi | 348/53 |
| 7,535,607 B2 * | 5/2009 | Schwerdtner et al. | 359/9 |
| 2004/0263930 A1 | 12/2004 | Payne | |

FOREIGN PATENT DOCUMENTS

| | | |
|---|---|---|
| GB | 2 350 963 | 12/2000 |
| WO | WO 2004 031841 | 4/2004 |
| WO | WO 2004044659 | 5/2004 |

OTHER PUBLICATIONS

Keiichi Meano et al., "Electro-Holographic Display Using 15 Mega Pixels LCD," Advanced 3D Telecommunication Project (3D Project), Telecommunicaton Advancement Organization of Japan (TAO), Tokyo, Japan, Mar. 1996; pp. 15-23; SPIE vol. 2652/15, XP-000923279.

* cited by examiner

*Primary Examiner* — Audrey Y Chang
(74) *Attorney, Agent, or Firm* — Saul Ewing LLP

(57) ABSTRACT

A device for holographic reconstruction of three-dimensional scenes includes optical focusing means which directs sufficiently coherent light from light means to the eyes of at least one observer via a spatial light modulator that is encoded with holographic information. The device has a plurality of illumination units for illuminating the surface of the spatial light modulator; each unit comprises a focusing element, and a light means that emits sufficiently coherent light such that each of these illumination units illuminates one separate illuminated region of the surface, whereby the focusing element and the light means are arranged such that the light emitted by the light means coincides close to or at the observer eyes.

20 Claims, 2 Drawing Sheets

DEVICE FOR HOLOGRAPHIC RECONSTRUCTION OF THREE-DIMENSIONAL SCENES

CROSS-REFERENCE TO RELATED APPLICATIONS

This is a divisional of U.S. application Ser. No. 11/418,946, filed May 5, 2006, which claims the priority of German Application No. DE 10 2005 022 658, filed on May 6, 2005, the entire contents of which are hereby incorporated in total by reference.

BACKGROUND OF THE INVENTION

1. Field of the Invention

This invention relates to a display device for reconstructing three-dimensional (3D-) scenes using large-area computer-generated video holograms (CGH) encoded in a spatial light modulator which includes electronically controllable cells. Said cells modulate the amplitude and/or phase of light by encoding each cell with hologram values corresponding to a video-hologram. Like auto-stereoscopic displays, reconstructions of video holograms also aim to present moving two- or three-dimensional scenes using a video display.

In this document a CGH describes a hologram that is calculated from a scene. The CGH comprises complex-valued numbers representing the amplitude and phase of light waves that are needed to reconstruct the scene. The CGH may be calculated e.g. by coherent ray tracing, by simulating the interference between light reflected by the scene and a reference wave, or by Fourier or Fresnel transforms.

A spatial light modulator (SLM) modulates a wave front of the incoming light. An ideal SLM would be capable of representing arbitrary complex-valued numbers, i.e. of separately controlling the amplitude and the phase of the light wave. However, a typical SLM controls only one property, either amplitude or phase, with the undesirable side effect of also affecting the other property.

There are different ways to modulate the light in amplitude or phase, e.g. electrically addressed liquid crystal SLM, optically addressed liquid crystal SLM, micro mirror devices or acousto-optic modulators. The modulation of the light may be spatially continuous or composed of individually addressable cells, one-dimensionally or two-dimensionally arranged, binary, multi-level or continuous.

A suitable spatial light modulator for holographic reconstruction of a 3D-scene is for example a Liquid Crystal Display (LCD). However, this invention can also be applied to other controllable spatial light modulators that modulate a light wave front. The invention can also be applied to continuous spatial light modulators, e.g. an optically addressed spatial light modulator (OASLM).

2. Background of the Invention

In the present document, the term "encoding" denotes the way in which the cells of the spatial light modulator are supplied with control values of cells of the video hologram so that a 3D-scene can be reconstructed from it.

In contrast to auto-stereoscopic displays, with video holograms an observer sees an optical reconstruction of a light wave front of a three-dimensional scene.

According to the present invention, the 3D-scene is reconstructed in a space that stretches between the eyes of an observer and the spatial light modulator (SLM). The SLM can also be encoded with video holograms such that the observer sees objects of a reconstructed three-dimensional scene in front of the SLM and other objects on or behind the SLM.

The cells of the spatial light modulator are preferably transmissive cells which are passed through by light, the rays of which are capable of generating interference at least at a defined position and over a coherence length of a few millimeters. This allows holographic reconstruction with an adequate resolution in at least one dimension. This kind of light will be referred to as 'sufficiently coherent light'.

In order to ensure sufficient temporal coherence, the spectrum of the light emitted by the light source must be limited to an adequately narrow wavelength range, i.e. it must be near-monochromatic. The spectral bandwidth of high-brightness LEDs is sufficiently narrow to ensure temporal coherence for holographic reconstruction. The diffraction angle at the SLM is proportional to the wavelength, which means that only a monochromatic source will lead to a sharp reconstruction of object points. A broadened spectrum will lead to broadened object points and smeared object reconstructions. The spectrum of a laser source can be regarded as monochromatic. The spectral line width of a LED is sufficiently narrow to facilitate good reconstructions.

Spatial coherence relates to the lateral extent of the light source. Conventional light sources, like LEDs or Cold Cathode Fluorescent Lamps, can also meet these requirements if they radiate light through an adequately narrow aperture. Light from a laser source can be regarded as emanating from a point source within diffraction limits and, depending on the modal purity, leads to a sharp reconstruction of the object, i.e. each object point is reconstructed as a point within diffraction limits.

Light from a spatially incoherent source is laterally extended and causes a smearing of the reconstructed object. The amount of smearing is given by the broadened size of an object point reconstructed at a given position. In order to use a spatially incoherent source for hologram reconstruction, a trade-off has to be found between brightness and limiting the lateral extent of the source with an aperture. The smaller the light source, the better is its spatial coherence.

A line light source can be considered to be a point light source if seen from a right angle to its longitudinal extension. Light waves can thus propagate coherently in that direction, but incoherently in all other directions.

In general, a hologram reconstructs a scene holographically by coherent superposition of waves in the horizontal and the vertical directions. Such a video hologram is called a full-parallax hologram. Given a sufficiently large observer window or observer region the reconstructed object facilitates motion parallax in the horizontal and the vertical directions, like a real object. However, a large observer region requires high resolution in both the horizontal and the vertical direction of the SLM.

Often, the requirements on the SLM are lessened by restriction to a horizontal-parallax-only (HPO) hologram. The holographic reconstruction takes place only in the horizontal direction, whereas there is no holographic reconstruction in the vertical direction. This results in a reconstructed object with horizontal motion parallax. The perspective view does not change upon vertical motion. A HPO hologram requires less resolution of the SLM in vertical direction than a full-parallax hologram. A vertical-parallax-only (VPO) hologram is also possible but uncommon. The holographic reconstruction occurs only in the vertical direction and results in a reconstructed object with vertical motion parallax. There is no motion parallax in the horizontal direction. The different perspective views for the left eye and right eye have to be created separately.

3. Description of Related Art

Displays with spatial light modulators in conventional LCD technology may, for example, be used for encoding and reconstructing. Known transmissive flat displays with high resolution may be used for large-area reconstructions.

Light modulators with cells which directly modulate the phase of the light may preferably be used, such as light modulators based on Freedericksz cells. However, this invention can also be applied to other spatial light modulators.

An illumination system for a computer-generated hologram, where the representation of a vertical parallax in the reconstruction is disregarded, is disclosed in WO 03/021363. The illumination system uses a line light source composed of conventional point light sources. This line light source emits collimated light. It is disposed in the focal plane of a cylindrical lens arranged at a right angle to it and creates a multitude of plane waves, which illuminate a SLM in transmission mode at various angles of incidence. In contrast to a point light source, the image is thereby uniformly illuminated without a diffuser being needed.

Document WO 00/75699 discloses a holographic display which reconstructs a video hologram with the help of partial holograms. Partial holograms being encoded on a common electronically addressable spatial light modulator (EASLM) are sequentially projected to an intermediate plane. This process is executed fast enough for an observer to perceive the reconstructions of all partial holograms as a single reconstruction of the entire 3D object.

The partial holograms are arranged in a regular structure in the intermediate plane by a specially designed illumination and projection system, for example including a shutter which is controlled in synchronism with the EASLM and which only allows the corresponding partial hologram to pass through and which in particular blanks diffraction orders that are not used. Difficulties occur when realizing an illumination system to illuminate each partial hologram with the required coherence and under the correct reconstruction angle. In order to avoid a large lens to be used as the optical element for reconstruction, it has been proposed to use a lens array.

WO 2004/044659 (US2006/0055994) filed by the applicant also describes a device for reconstructing three-dimensional scenes by way of diffraction of sufficiently coherent light, which contains a point light source or line light source, a lens for focusing the light and a spatial light modulator. In contrast to conventional holographic displays, the SLM in transmission mode reconstructs a 3D-scene in at least one virtual observer window. Each observer window is situated near the observer's eyes and is restricted in size so that the observer windows are situated in a single diffraction order, so that each eye sees the complete reconstruction of the three-dimensional scene in a frustum-shaped reconstruction space, which stretches between the SLM surface and the observer window. To allow a holographic reconstruction free of disturbance, the observer window size must not exceed the periodicity interval of one diffraction order of the reconstruction. However, it is at least large enough to see the entire reconstruction of the 3D-scene through the window(s). The other eye can see through the same observer window or is assigned a second observer window, which is accordingly created by a second light source. If the positions of the observer's eyes change, a tracking system displaces the light sources and thus tracks the observer windows accordingly. Here, a visibility region, which would typically be rather large, is limited to the locally positioned observer windows. The known solution reconstructs in a diminutive fashion the large area resulting from a high resolution of a conventional SLM surface, reducing it to the size of the observer windows. This leads to the effect that the diffraction angles, which are small due to geometrical reasons, and the resolution of current generation SLMs are sufficient to achieve a high-quality real-time holographic reconstruction using reasonable, consumer level computing equipment.

However, the known solution exhibits the disadvantage that a large, voluminous, heavy and thus expensive lens is required for focusing due to the large SLM surface area. Consequently, the device will have a large depth and weight. Another disadvantage is represented by the fact that the reconstruction quality is reduced significantly due to aberrations at the margins when using such large lenses.

A further disadvantage of the known embodiments is an insufficient luminous intensity of the SLM. Current solutions show a luminous intensity of the order of 1 $cd/m^2$ and are hence far below the intensity of a conventional display (ca. 100 $cd/m^2$). One reason for the low brightness is the low intensity of the coherent light sources on the SLM.

SUMMARY OF THE INVENTION

Considering the above-mentioned disadvantages of prior art solutions, the object of this invention is to provide a device for encoding large-area video holograms using a conventional spatial light modulator with a relatively large cell pitch so to achieve high-quality real-time holographic reconstructions with reasonable effort of computation load while avoiding the aforementioned disadvantages.

An additional object of the invention is to increase the luminous intensity of the holographic reconstruction.

To solve this object, the present invention uses a device for holographic reconstruction of three-dimensional scenes by optical focusing means which direct sufficiently coherent light, after modulation by a spatial light modulator, encoded with video hologram information, to the eyes of at least one observer. Thereby, a three-dimensional scene is holographically reconstructed in the space stretching between the assigned observer's eye and the spatial light modulator surface by way of diffraction of the light by light-modulator cells, so that the scene is rendered visible for both tracked observer eyes.

A spatial light modulator is encoded with video hologram information. At least one large-area video hologram or a sequence of video holograms is encoded in said the spatial light modulator, the video hologram(s) having parallax information both in the vertical and in the horizontal direction or the video hologram(s) having parallax information in one direction only and a time-multiplexing mode displaying the missing parallax information. if a space-multiplexing mode displays the missing parallax information, the video hologram information contains two space-multiplexed video holograms providing simultaneously the missing parallax information to each observer eye.

According to this invention, the focusing means is an arrangement of a multitude of focusing elements. Together with an assigned light means that emits sufficiently coherent light, each focusing element forms a separate illumination unit that illuminates a discrete region of the spatial light modulator surface simultaneously with further illumination units. The focusing element and the light means are arranged in each illumination unit such that the bundles of rays emitted by the illumination units coincide in a virtual observer window near the eyes of at least one observer. Each of the individual illumination units illuminates a local region of the spatial light modulator surface encoded with at least one extended video hologram. All illuminated regions jointly and simultaneously reconstruct the complete three-dimensional-scene in a frustum in front of the observer eyes.

This invention reduces the volume and weight of the device as well as significantly reducing the disturbing lens aberrations; luminous intensity increases.

Another major advantage of this invention is that the light emitted by the light means does not need to show coherence among the individual active illumination units. This allows the simultaneous use of a multitude of conventional light sources for illumination of the spatial light modulator in order to increase the luminous intensity. Moreover, because the light of adjacent illumination units is not capable of generating interference, this prevents the occurrence of multiple interferences which would be caused by a multitude of coherent light source locations.

The incoherence of the light means of adjacent illumination units favorably increases the diffraction efficiency by dividing the spatial light modulator surface into a multitude of small regions illuminated by different illumination units.

According to this document, each light means that emits sufficiently coherent light may contain a single coherent light element in form of a point light source or a line light source. Alternatively, a light source arrangement of several light elements can also form a complete light means. Such an arrangement can contain several point light sources that form a line light source, or basic color light sources that provide illumination for color holograms.

In a preferred embodiment of this invention, the focusing elements are lenses arranged in an array that forms a lenticular.

In the best mode for implementing the invention, the focusing elements are cylindrical lenses, also known as lenticels. In this case, the assigned light means are provided in the form of line light sources arranged parallel to the arrangement of cylindrical lenses. The light means thus emit light that is sufficiently coherent only in one preferred direction that is perpendicular to the direction of the lines, so that a reconstruction is only performed in this direction with the corresponding encoded parallax. This embodiment of illumination means causes video holograms that are restricted to horizontal-parallax-only or vertical-parallax-only holograms, respectively. The holographic reconstruction takes place only in the direction orthogonal to the lines of the line sources, whereas there is no holographic reconstruction in the direction of the line sources. The required missing parallax can be realized e.g. by spatial interleaving of several separate, one-dimensional holograms.

According to an additional embodiment, the extension of the focusing elements in the focusing means is selected in such a way that all images of a light means through the adjacent focusing elements will be directed significantly outside the view of the observer eyes. This reduces the disturbances which might occur by repetitions of the reconstruction.

A solution for spatial interleaving of the video holograms and reconstruction has been described in applicant's former patent application WO2006027228 (US2006050340), which has not been disclosed by the day of this application. A required horizontal parallax is realized by the reconstruction of two separate, one-dimensional holograms for a parallax that corresponds to the eye distance, instead of the reconstruction of a second two-dimensional video hologram. In an alternative embodiment the two video holograms may be reconstructed sequentially in different observer windows.

The illumination units preferably emit nearly collimated bundles of rays which coincide in a virtual observer window limited to a single diffraction order and the observer plane.

The virtual observer window is located near the observers' eyes and is the place where the reconstruction can be seen without disturbance.

Slot diaphragms may be disposed between the light means and focusing means of the illumination units in order to realize sufficiently coherent line light sources.

In each illumination unit, the position of the light means with respect to the focusing means position defines the location in the observer plane where the bundles of rays emitted by all illumination units coincide. Therefore, e.g. a transmissive spatial light shutter and corresponding backlight means can be used to locate the observer window(s) according to the position of the viewer's eyes by activating corresponding illumination lines, e.g. transmissive elements of the illuminated shutter arranged in a line pattern.

In a specific embodiment, the spatial light shutter and the corresponding backlight means can be replaced by a controllable LED or organic LED arrangement. The point light sources of this arrangement have small cross-sectional areas and can be activated discretely or like line light sources. This considerably saves energy for illumination. Like a slot diaphragm, each line light source containing a LED arrangement fulfils the condition of sufficient coherence in itself. This allows the realization of an illumination unit in a compact fashion having high energy efficiency.

In a further embodiment, the light means can be realized by scanning a scattering layer with a deflected laser beam. The laser beam is deflected by a beam deflector, e.g. a scanning mirror, and is focused on the scattering layer. The spots where the laser beam is incident on this scattering layer act as light sources. By controlling the beam deflectors and pulse modulating the laser beam, any desired array of light sources can be generated to illuminate the focusing means. The laser beam has to be focused on the scattering layer in order to generate light sources with small lateral size. The scattering angle of the scattering layer determines the solid angle in which the light is emitted and has to be chosen such that the focusing means is adequately illuminated. A scanned laser beam has the advantage that all light is used to illuminate the focusing means and the SLM surface. No light is absorbed in a transmissive shutter and the efficiency is improved.

Because the focusing means and the spatial light modulator are disposed at a minimum distance to each other, their position may even be swapped.

The device according to this invention allows the use of focusing means with short focal lengths; and a holographic display with a low weight and depth can be realized which exhibits improved luminous intensity. Moreover, aberrations are minimized by optical focusing means having small dimensions.

Because of the short focal lengths of the focusing elements, this invention is particularly suited to using light means arranged as light arrangements with point light sources which can be activated discretely. The focusing element of each illumination unit can thus be assigned to a single line array for line shaped illumination, or the entirety of illumination units of the device can be assigned to one single light area.

Further, a position detection system detects changes in the spatial position of the observer's eyes in a known manner. If the position of the observer's eyes changes, the observer windows are tracked by displacement of the activated illumination lines of the illumination means.

If the axial position of the observer's eyes, i.e. their distance to the display, changes, either the distance between the light means and the optical focusing means or the focal length of the optical focusing means may be adapted. Also a combination of both means is possible.

There are different means to adapt the focal length of the focusing means. Known liquid lenses use electro-wetting or a variable liquid volume under a deformable membrane to tune the radius of curvature and hence the focal length of a lens. This principle may also be applied to lens arrays and lenticulars. It is also possible to vary the focal length by tuning the refractive index of the lens medium or of the surrounding host medium. This can be achieved with liquid crystal material whose refractive index can be controlled by application of an electric field.

The latter embodiment with a light array allows assigning a multitude of point light sources or line light sources which can be activated discretely to each focusing element of an illumination unit. Such an array can be used for tracking the observer eyes like a shutter matrix illuminated with backlight means. The aforementioned position detection system activates for each focusing element a point light source or line light source which corresponds with the current eye position and thus tracks the observer windows according to the changes in the eye position.

Now, the method and device according to the present invention will be described in more detail with the help of embodiments.

The principle of the invention will be explained based on holographic reconstructions with monochromatic light. However, it appears to those skilled in the art that this invention may as well be applied to color holographic reconstructions. In the latter case each cell, e.g. containing RGB sub-pixels which are arranged in pixel columns, would individually reconstruct the primary color portions needed for color representation of three-dimensional scenes, said color portions being superimposed so that the viewer sees a color reconstruction.

DETAILED DESCRIPTION OF THE INVENTION

These drawings schematically show details of the holographic display.

In the described embodiment, a video hologram is encoded in a transmissive spatial light modulator SLM. However, transflective and reflective light modulators SLM may also be used, preferably those which directly modulate the phase of the light waves, such as Freedericksz cells.

Further, for better understanding, the described embodiment explains the use of one-parallax encoded holograms for reconstructing a 3D-scene by a combination of a holographic and an auto-stereoscopic display. Such a specific embodiment using spatial-multiplexing of reconstructions is proposed in applicant's patent applications WO2006/027228 (US2006/050340). This allows a combination of line light sources, lenticular and further optical elements for conventional auto-stereoscopic image separation. The image separation means needed for separation of the two spatially multiplexed parallax holograms are not the object of the invention. The image separation means are not shown in the figures, because various methods for multiplexing parallax holograms can be used as an alternative, e.g. time-multiplexing. An embodiment using time-multiplex reconstruction is proposed in applicant's patent applications WO 2004/044659 (US2006/055994).

A video hologram with a coherent superposition of waves in the vertical direction is not influenced by the auto-stereoscopic image separation in the horizontal direction and vice versa. The holographic reconstruction in vertical direction satisfies eye accommodation. The auto-stereoscopic image separation together with spatial multiplexing generates different perspective views for the left eye and the right eye.

However, the present invention can also be used for a device reconstructing full-parallax video holograms. This device uses illumination units containing several point sources arranged in a source matrix, in combination with an array of assigned rotationally symmetrical lenses.

It is an advantage of this invention that all illumination units do not need separate encapsulation between each point line source and its assigned lenticel. The light of adjacent illumination units may overlap in small portions on the lens array.

Figure 1:
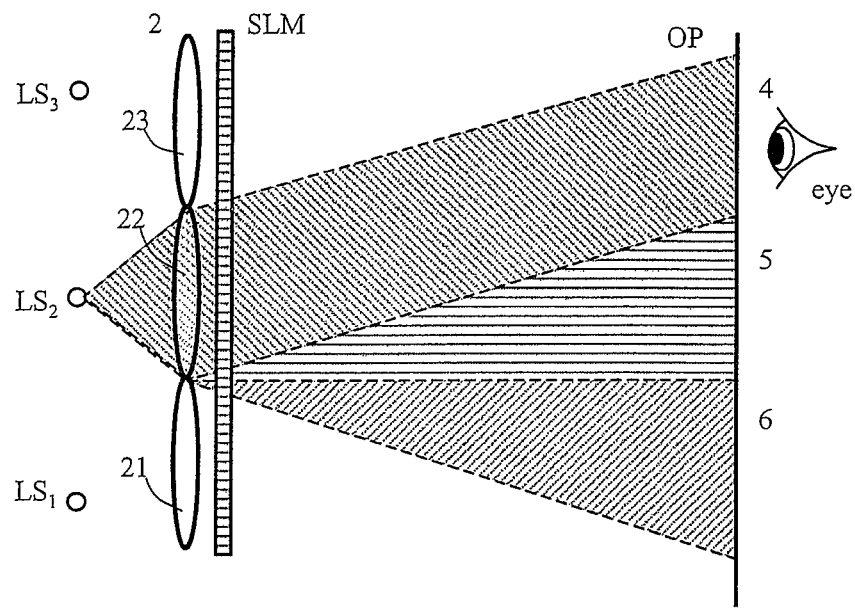
FIG. 1 shows a device for holographic reconstruction of a 3D-scene, with beams of one illumination unit in a side view.

FIG. 1 is a side view showing three focusing elements 21, 22, 23 of a vertical focusing means 2 in the form of cylindrical lenses horizontally arranged in an array. The nearly collimated beams of a horizontal line light source LS2 passing through the focusing element 22 of an illumination unit and running to an observer plane OP are exemplified.

According to the invention, a multitude of line light sources LS1, LS2, LS3 are arranged one above another. Each light source emits light which is sufficiently coherent in the vertical direction and which is incoherent in the horizontal direction. This light passes through the transmissive cells of the light modulator SLM. The light is only diffracted in the vertical direction by cells of the light modulator SLM, which are encoded with a hologram. The focusing element 22 images a light source LS2 in the observer plane OP in several diffraction orders, of which only one is useful. The beams emitted by the light source LS2 are exemplified to pass only through the focusing element 22 of focusing means 2. In FIG. 1 the three beams show the first diffraction order 4, the zeroth order 5 and the minus first order 6.

In contrast to a single point light source, a line light source allows the production of a significantly higher luminous intensity. Using several holographic regions with already increased efficiency and with the assignment of one line light source for each portion of a 3D-scene to be reconstructed, improves the effective luminous intensity. Another advantage is that, instead of a laser, a multitude of conventional light sources, which are positioned e.g. behind a slot diaphragm, which may also be part of a shutter, generate sufficiently coherent light.

Figure 2:
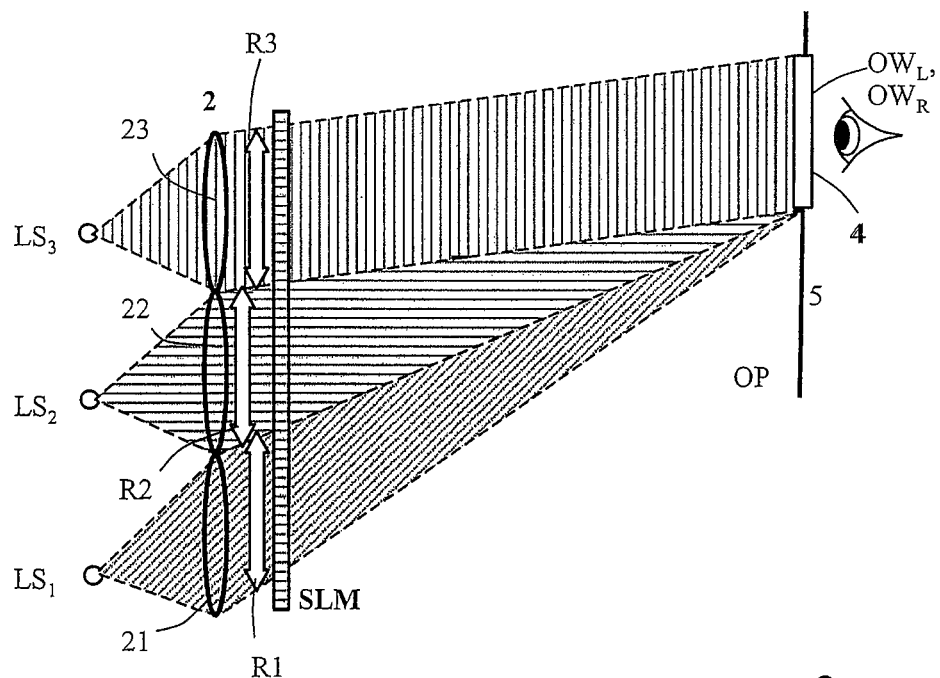
FIG. 2 shows the device for holographic reconstruction of a 3D-scene, with one diffraction order of three illumination units in a side view.

FIG. 2 is a side view showing the same device with horizontally arranged line light sources LS1-LS3 and the focusing means 2 including cylindrical lenses 21-23 to generate nearly collimated beams, here for the first diffraction order 4. Each nearly collimated beam illuminates an assigned illuminated region R1, R2 or R3 of the light modulator SLM surface. The extension of each illuminated region R1-R3 is shown by a white arrow. All nearly collimated beams coincide in the observer plane OP to form at least one virtual observer window OWL or OWR for the pair of eyes of an observer. The observer windows OWL, OWR, which are situated behind one another in the side view shown in FIG. 2, are positioned for example in the first diffraction order 4 and extend across a part of its periodicity interval.

The light sources LS1-LS3 are disposed close to the rear focal distance of the cylindrical lenses 21-23. Instead of the first diffraction order shown in this example, other diffraction orders may be used for reconstruction depending on the encoding mode of the used light modulator SLM. E.g., when a phase modulating light modulator SLM is used it is possible to use the zeroth diffraction order. That provides more brightness.

As mentioned above, this embodiment uses a light modulator encoded with a one-parallax hologram. This means that for reconstructing a 3D-scene with parallax information, the light modulator has to be encoded with two holograms and the display has to provide two virtual observer windows OWL and OWR, separated by additional auto-stereoscopic separation means. These means are not the object of this invention.

The line light sources LS1-LS3 and the cylindrical lenses 21-23 are arranged with respect to each other such that the lenses project the light of the light sources LS1-LS3 to the observer windows OWL, OWR, whereby all left and right reconstructions are respectively separated for the left and right eye by the separation means, not shown, which would be disposed behind one another in this side view. All beams of the illumination units diffracted by the light modulator SLM coincide in one, e.g. in the first, diffraction order. In another embodiment, different diffraction orders of light emitted by different illumination units of a device may coincide in an observer window.

Figure 3:
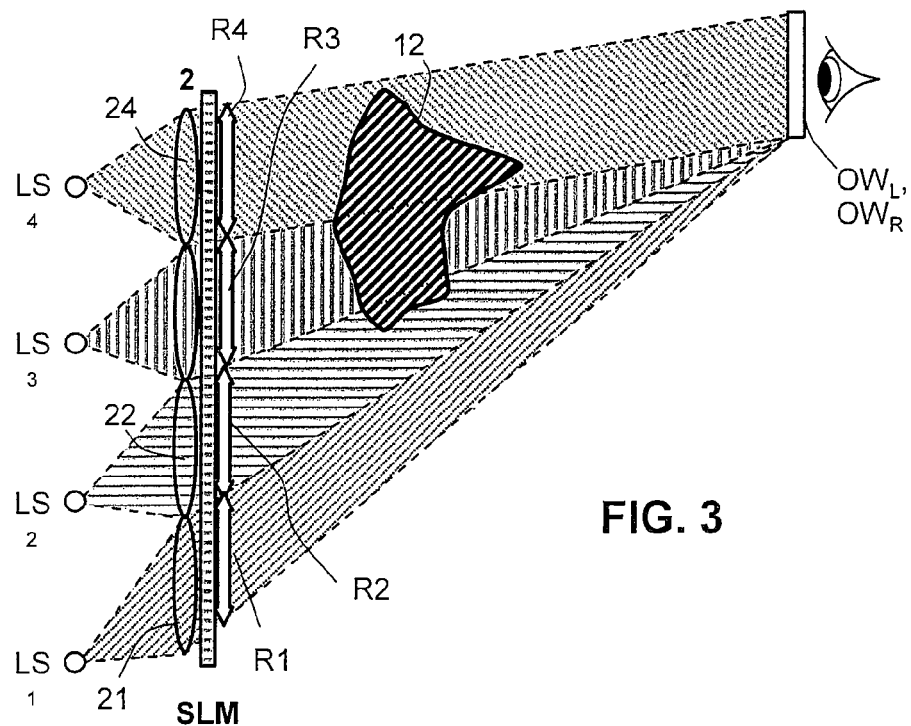
FIG. 3 shows the device for holographic reconstruction of a 3D-scene, with the beams of one diffraction order of adjacent illumination units in a side view.

FIG. 3 is a side view of the device showing illumination units, each comprising a line light source LS1-LS4. The lenses 21-24, together with the cylindrical lenses of further illumination units, not shown, form a lenticular. Each of the horizontally aligned cylindrical lenses 21 . . . 24 focuses the light of the corresponding line light sources LS1 . . . LS4 in the vertical direction, resulting in a hologram containing parallax information in the vertical direction only. In this Fig., a reconstruction 12 of a scene is visible through two observer windows OWL, OWR, providing the parallax information for the three-dimensional mode.

The illumination units provide beams, each illuminating their own illumination region of a video hologram, which is encoded in the light modulator SLM. Therefore, all these beams divide the encoded video hologram into illuminated regions R1-R4.

Referring to FIG. 3, the illuminated region R4 reconstructs the corresponding part of the reconstruction 12. In the location where the beams coincide, the reconstruction 12 can be achieved in many ways. The 3D-scene is either reconstructed from one of the illuminated regions R2, R3 or R4, or jointly by parts of both. However, there is no difference in the sensation perceived by the observer. As shown above, all illumination units of a device have the same structure and dimensions and thus exhibit comparable properties, only the positions of the light sources LS1-LS4 are individually adapted according to the observer's eye position. This device can be manufactured very easily.

Figure 4:
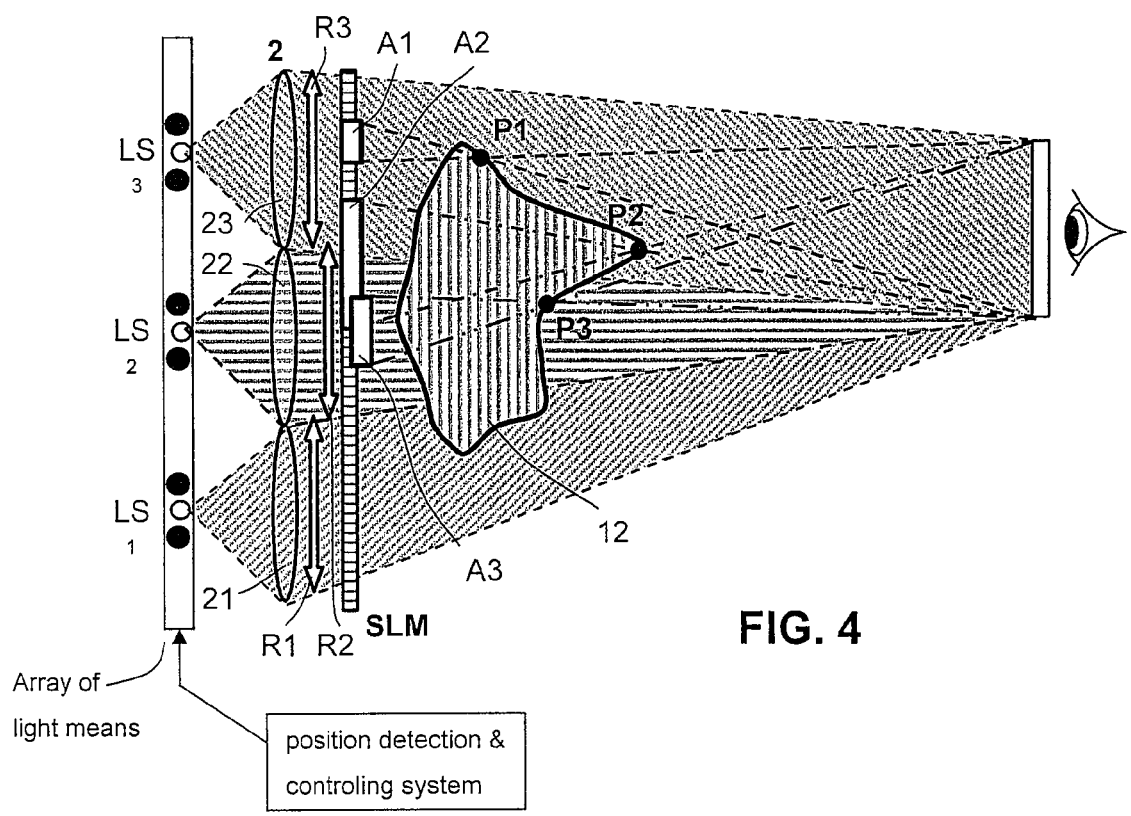
FIG. 4 shows details of the device with different object points of a reconstruction and its restricted encoding areas

FIG. 4 shows the function of the invention in more detail. In contrast to conventional holographic displays, according to the invention a first object point P1 of a three-dimensional scene is only encoded with cells arranged inside a restricted area Al of the light modulator SLM. Additionally, FIG. 4 shows object points P2 and P3 located at different distances and positions to the tracked virtual observer window OWL or OWR. The position of each object point P1-P3 defines the location on the light modulator surface and the distance defines the extension of the corresponding restricted area A1, A2 or A3 on the light modulator SLM. That means, each object point P1, P2 and P3 has a different extension and location of the corresponding restricted area A1-A3.

According to the invention, the restricted areas A1 . . . An of all object points P1 . . . Pn have to be reconstructed by a number m of illuminated regions R1-Rm. In most cases the number m of illumination regions is much smaller than the number n of object points.

Area Al is very small and reconstructs object point P1 via a first illumination unit, constituted by light source LS3 and lens 23 and providing an illuminated region R3. In contrast thereto, area A2 has a large extension and is located in the two illuminated regions R2 and R3, such that both illuminated regions R2 and R3 independently contribute to the reconstruction of the object point P2. Area A3 is also very small and reconstructs object point P3 via the second illumination unit solely constituted by light source LS2 and lens 22.

In one embodiment of this invention, the luminous intensities of individual illumination units may differ according to the specific properties of the encoded values of each of the corresponding illuminated regions R1-R4.

A device according to the invention allows several preferable combinations of light sources and lenses:

A two-dimensional illumination array of point sources and a two-dimensional focusing array of rotationally symmetrical lenses is preferable for large full-parallax holograms. Each point source corresponds to one lens. Each light source has to illuminate only a single lens of the lens array, which facilitates splitting the required amount of total luminous flux to many light sources. This lessens the requirements on the intensity of each light source. Also a lens array is much easier to fabricate and less bulky than a single large lens with the same focal length.

An illumination array of vertically aligned line sources and a focusing array of vertically aligned cylindrical lenses are used for horizontal-parallax-only holograms. The vertically aligned cylindrical lenses focus the light in the horizontal direction. In the vertical direction there is no motion parallax. Each line source corresponds to one lenticel.

Compared with a two-dimensional illumination array of point sources and a two-dimensional focusing array of lenses, there is the advantage that a lenticular is easier to fabricate than a 2D array of spherical lenses. Also the requirements on the intensity in a line light source are lower than for a point source: the light flux is distributed on a line and not concentrated on a small spot.

An arrangement of horizontally aligned line light sources and an array of horizontally aligned cylindrical lenses is used for the described vertical-parallax-only holograms.

As described above, this combination of light sources and lenticulars may be further combined with optical elements for conventional auto-stereoscopic image separation. The vertical-parallax hologram with coherent superposition of waves in the vertical direction is not influenced by the auto-stereoscopic image separation in the horizontal direction and vice versa. This results in a combination of a holographic and an auto-stereoscopic display. The holographic reconstruction in the vertical direction satisfies eye accommodation. The auto-stereoscopic image separation together with spatial multiplexing generates different perspective views for the observer's eyes.

Color holograms can either be generated with temporal or spatial multiplexing. For temporal multiplexing R, G and B light sources are switched synchronously with the corresponding hologram contents on the SLM. For spatial multiplexing three R, G and B holograms are displayed on interlaced R, G and B pixels, illuminated by a spatially coherent white light source or separate R, G and B sources.

In an embodiment for color encoding, the alternate RGB sub-pixels for the three primary colors reconstruct three individual primary color portions of a 3D-scene from three corresponding partial holograms. The primary color portions of the 3D-scene coincide in order to form a color reconstruction for the viewer.

According to a preferred embodiment of the invention, the array of light sources that illuminates the array of lenses is generated by a light projection device. Such a light projection device is preferably realized by a computer-generated hologram encoded on a spatial light modulator that reconstructs the array of light sources.

APPENDIX I

Technical Primer

The following section is meant as a primer to several key techniques used in some of the systems that implement the present invention.

In conventional holography, the observer can see a holographic reconstruction of an object (which could be a changing scene); his distance from the hologram is not however relevant. The reconstruction is, in one typical optical arrangement, at or near the image plane of the light source illuminating the hologram and hence is at the Fourier plane of the hologram. Therefore, the reconstruction has the same far-field light distribution of the real world object that is reconstructed.

One early system (described in WO 2004/044659 and US 2006/0055994) defines a very different arrangement in which the reconstructed object is not at or near the Fourier plane of the light source illuminating the hologram at all. Instead, a virtual observer window zone is at the Fourier plane of the hologram; the observer positions his eyes at this location and only then can a correct reconstruction be seen. The hologram is encoded on a LCD (or other kind of spatial light modulator) and illuminated so that the viewing window becomes the Fourier transform of the hologram (hence it is a Fourier transform that is imaged directly onto the eyes); the reconstructed object is then the Fresnel transform of the hologram since it is not in the focus plane of the lens. It is instead defined by a near-field light distribution (modelled using spherical wavefronts, as opposed to the planar wavefronts of a far field distribution). This reconstruction can appear anywhere between the viewing window (which is, as noted above, in the Fourier plane of the hologram) and the LCD or even behind the LCD as a virtual object.

There are several consequences to this approach. First, the fundamental limitation facing designers of holographic video systems is the pixel pitch of the LCD (or other kind of light modulator). The goal is to enable large holographic reconstructions using LCDs with pixel pitches that are commercially available at reasonable cost. But in the past this has been impossible for the following reason. The periodicity interval between adjacent diffraction orders in the Fourier plane is given by $\lambda D/p$, where $\lambda$ is the wavelength of the illuminating light, D is the distance from the hologram to the Fourier plane and p is the pixel pitch of the LCD. But in conventional holographic displays, the reconstructed object is in the Fourier plane. Hence, a reconstructed object has to be kept smaller than the periodicity interval; if it were larger, then its edges would blur into a reconstruction from an adjacent diffraction order. This leads to very small reconstructed objects—typically just a few cm across, even with costly, specialised small pitch displays. But with the present approach, the viewing window (which is, as noted above, positioned to be in the Fourier plane of the illuminating light source) need only be as large as the eye pupil. As a consequence, even LCDs with a moderate pitch size can be used. And because the reconstructed object can entirely fill the frustrum between the viewing window and the hologram, it can be very large indeed, i.e. much larger than the periodicity interval.

There is another advantage as well, deployed in one variant. When computing a hologram, one starts with ones knowledge of the reconstructed object —e.g. you might have a 3D image file of a racing car. That file will describe how the object should be seen from a number of different viewing positions. In conventional holography, the hologram needed to generate a reconstruction of the racing car is derived directly from the 3D image file in a computationally intensive process. But the viewing window approach enables a different and more computationally efficient technique. Starting with one plane of the reconstructed object, we can compute the viewing window as this is the Fresnel transform of the object. We then perform this for all object planes, summing the results to produce a cummulative Fresnel transform; this defines the wave field across the viewing window. We then compute the hologram as the Fourier transform of this viewing window. As the viewing window contains all the information of the object, only the single-plane viewing window has to be transformed to the hologram and not the multi-plane object. This is particularly advantageous if there is not a single transformation step from the viewing window to the hologram but an iterative transformation like the Iterative Fourier Transformation Algorithm. Each iteration step comprises only a single Fourier transformation of the viewing window instead of one for each object plane, resulting in significantly reduced computation effort.

Another interesting consequence of the viewing window approach is that all the information needed to reconstruct a given object point is contained within a relatively small section of the hologram; this contrasts with conventional holograms in which information to reconstruct a given object point is distributed across the entire hologram. Because we need encode information into a substantially smaller section of the hologram, that means that the amount of information we need to process and encode is far lower than for a conventional hologram. That in turn means that conventional computational devices (e.g. a conventional DSP with cost and performance suitable for a mass market device) can be used even for real time video holography.

There are some less than desirable consequences however. First, the viewing distance from the hologram is important— the hologram is encoded and illuminated in such a way that only when the eyes are positioned at the Fourier plane of the hologram is the correct reconstruction seen; whereas in normal holograms, the viewing distance is not important. There are however various techniques for reducing this Z sensitivity or designing around it.

Also, because the hologram is encoded and illuminated in such a way that correct holographic reconstructions can only be seen from a precise and small viewing position (i.e. precisely defined Z, as noted above, but also X and Y coordinates), eye tracking may be needed. As with Z sensitivity, various techniques for reducing the X,Y sensitivity or designing around it exist. For example, as pixel pitch decreases (as it will with LCD manufacturing advances), the viewing window size will increase. Furthermore, more efficient encoding techniques (like Kinoform encoding) facilitate the use of a larger part of the periodicity interval as viewing window and hence the increase of the viewing window.

The above description has assumed that we are dealing with Fourier holograms. The viewing window is in the Fourier plane of the hologram, i.e. in the image plane of the light source. As an advantage, the undiffracted light is focused in the so-called DC-spot. The technique can also be used for Fresnel holograms where the viewing window is not in the image plane of the light source. However, care must be taken that the undiffracted light is not visible as a disturbing background. Another point to note is that the term transform should be construed to include any mathematical or computational technique that is equivalent to or approximates to a transform that describes the propagation of light. Transforms are merely approximations to physical processes more accurately defined by Maxwellian wave propagation equations; Fresnel and Fourier transforms are second order approximations, but have the advantages that (a) because they are algebraic as opposed to differential, they can be handled in a computationally efficient manner and (ii) can be accurately implemented in optical systems.

APPENDIX II

Glossary of Terms Used in the Description

Computer Generated Hologram

A computer generated video hologram CGH according to this invention is a hologram that is calculated from a scene. The CGH may comprise complex-valued numbers representing the amplitude and phase of light waves that are needed to reconstruct the scene. The CGH may be calculated e.g. by coherent ray tracing, by simulating the interference between the scene and a reference wave, or by Fourier or Fresnel transform.

Encoding

Encoding is the procedure in which a spatial light modulator (e.g. its constituent cells) are supplied with control values of the video hologram. In general, a hologram consists of complex-valued numbers representing amplitude and phase. Usually, a SLM is not capable of separately controlling the amplitude and the phase of a light wave. The SLM is either amplitude- or phase-modulating, often with the undesirable side effect of also affecting the other property. Therefore, the encoding depends on the type of modulation. E.g., for a purely amplitude-modulating SLM Burckhardt encoding may be used, where three adjacent SLM cells and the detour phase are used to represent one complex number by three positive real values. For a purely phase-modulating SLM one complex number may be represented by two adjacent cells.

Encoded Area

The encoded area is typically a spatially limited area of the video hologram where the hologram information of a single scene point is encoded. The spatial limitation may either be realized by an abrupt truncation or by a smooth transition achieved by Fourier transform of an observer window to the video hologram.

Fourier Transform

The Fourier transform is used to calculate the propagation of light in the far field of the spatial light modulator. The wave front is described by plane waves.

Fourier Plane

The Fourier plane contains the Fourier transform of the light distribution at the spatial light modulator. Without any focusing lens the Fourier plane is at infinity. The Fourier plane is equal to the plane containing the image of the light source if a focusing lens is in the light path close to the spatial light modulator.

Fresnel Transform

The Fresnel transform is used to calculate the propagation of light in the near field of the spatial light modulator. The wave front is described by spherical waves. The phase factor of the light wave comprises a term that depends quadratically on the lateral coordinate.

Frustrum

A virtual frustrum is constructed between an observer window and the SLM and is extended behind the SLM. The scene is reconstructed inside this frustrum. The size of the reconstructed scene is limited by this frustrum and not by the periodicity interval of the SLM.

Light Means

The light means may consist either of a coherent light source like a laser or a partially coherent light source like a LED. The temporal and spatial coherence of the partially coherent light source has to be sufficient to facilitate a good scene reconstruction, i.e. the spectral line width and the lateral extension of the emitting surface have to be sufficiently small.

Observer Window (OW)

The observer window is a virtual window in the observer plane through which the reconstructed 3D object can be seen. The OW is the Fourier transform of the hologram and is positioned within one periodicity interval in order to avoid that multiple reconstructions of the object being visible. The size of the OW has to be at least the size of an eye pupil. The OW may be much smaller than the lateral range of observer movement if at least one OW is positioned at the observer's eyes with an observer tracking system. This facilitates the use of a SLM with moderate resolution and hence small periodicity interval. The OW can be imagined as a keyhole through which the reconstructed 3D object can be seen, either one OW for each eye or one OW for both eyes together.

Periodicity Interval

The CGH is sampled if it is displayed on a SLM composed of individually addressable cells. This sampling leads to a periodic repetition of the diffraction pattern. The periodicity interval is $\lambda D/p$, where $\lambda$ is the wavelength, D the distance from the hologram to the Fourier plane, and p the. pitch of the SLM cells.

Reconstruction

The illuminated spatial light modulator encoded with the hologram reconstructs the original light distribution. This light distribution was used to calculate the hologram. Ideally, the observer would not be able to distinguish the reconstructed light distribution from the original light distribution. In most holographic displays the light distribution of the scene is reconstructed. In our display, rather the light distribution in the observer window is reconstructed.

Scene

The scene that is to be reconstructed is a real or computer generated three-dimensional light distribution. As a special case, it may also be a two-dimensional light distribution. A scene can constitute different fixed or moving objects arranged in a space.

Spatial Light Modulator (SLM)

A SLM is used to modulate the wave front of the incoming light. An ideal SLM would be capable of representing arbitrary complex-valued numbers, i.e. of separately controlling the amplitude and the phase of a light wave. However, a typical SLM controls only one property, either amplitude or phase, with the undesirable side effect of also affecting the other property.

The invention claimed is:

1. Device for reconstructing three-dimensional scenes by video holograms, the reconstructed three-dimensional scene being a three-dimensional light distribution being viewed by an observer, the device having
- optical focusing means, including a plurality of focusing elements, which directs coherent light from light means to the eyes of at least one observer via a first spatial light modulator that is encoded with holographic information, wherein:
- the device has a plurality of illumination units for illuminating the surface of the said first spatial light modulator, each illumination unit comprising one of the focusing elements, and a light means that emits sufficiently coherent light such that each of the illumination units illuminates one separate illuminated region of the surface of said first spatial light modulator and thereby generating the three-dimensional light distribution representing the reconstructed three-dimensional scene being viewed by the observer, whereby said focusing elements, said first spatial light modulator and said light means are arranged such that the light emitted by said light means coincides close to or at the observer eyes.

2. Device according to claim 1, with a multitude of light means, which are mutually incoherent, for simultaneous illumination of the spatial light modulator surface in order to increase the luminous intensity.

3. Device according to claim 1, where the spatial light modulator is encoded irrespective of the boundaries between the illuminated regions, such that all illuminated regions simultaneously reconstruct the three-dimensional scene using the same video hologram.

4. Device according to claim 1, where the illuminated regions are illuminated with different intensity.

5. Device according to claim 1, where the illumination units emit bundles of rays which coincide in at least one observer window.

6. Device according to claim 1, where the focusing elements image the light means onto the observer plane whereby all images coincide.

7. Device according to claim 1, where the focusing elements are lenses or where the focusing elements are cylindrical lenses arranged as a lenticular, and where the light means are line light sources.

8. Device according to claim 1, where the focusing elements are cylindrical lenses arranged as a lenticular, and where the light means are line light sources and where the light emitted by the line light sources are formed by slot diaphragms.

9. Device according to claim 1, where the extension of the focusing elements in the focusing means is selected in such a way that all light of a light means through the adjacent focusing elements will be directed significantly outside the view of the observer's eyes.

10. Device according to claim 1, where the light means are arranged in an array with controllable and addressable light sources which are addressed and activated discretely and the device contains a position detection and controlling system, which calculates and activates addressed light sources according to calculated eye position data, for tracking the directed light according to the position of the observer's eyes.

11. Device according to claim 10, where the position detection system displaces the activated sources of the array according to the lateral changes of the position of the observer's eyes.

12. Device according to claim 10, where the position detection and controlling system adapts the distances between activated sources of the array according to changes in the distance between the observer and the device.

13. Device according to claim 12, where the distance between the light means and the optical focusing means is adaptable.

14. Device according to claim 12, where the focal length of the optical focusing means is adaptable by tuning the radius of curvature and hence the focal length of a lens.

15. Device according to claim 10, where an electronically controllable light projection device realizes the light arrangement, wherein the light projection device is an additional spatial light modulator encoded with a computer-generated hologram.

16. Device according to claim 10, where the light means in each illumination unit is an array of point light sources that are discretely activated.

17. Device according to claim 10, where the light means in each illumination unit is a line array of point light sources that are discretely activated.

18. Device according to claim 10, where a single light arrangement provides the light means that emits coherent light for all illumination units of the device, whereby each focusing element in an illumination unit is assigned to a multitude of point light sources or line light sources that are discretely activated, and where the position detection and controlling system activates for each focusing element one point light source or line light source which corresponds to the current position of the observer's eyes.

19. Device for reconstructing three-dimensional scenes by video holograms, the reconstructed three-dimensional scene being a three-dimensional light distribution being viewed by an observer, the device having
- optical focusing means, including a plurality of focusing element, which directs coherent light from light means to the eyes of at least one observer via a first spatial light modulator that is encoded with holographic information, wherein:
- the device has a plurality of illumination units for illuminating the surface of the said first spatial light modulator, each illumination unit comprising one of the focusing elements, and a light means that emits sufficiently coherent light such that each of the illumination units illuminates one separate illuminated region of the surface of said first spatial light modulator and thereby generating the three-dimensional light distribution representing the reconstructed three-dimensional scene being viewed by the observer, whereby said focusing elements, said first spatial light modulator and said light means are arranged such that the light emitted by said light means coincides close to or at the observer eyes and
- the device being adapted such that the holographic information describing the three-dimensional scene is encodable into more than one of the illuminated regions of said first spatial light modulator for reconstructing the three-dimensional scene.

20. Device according to claim 19, where the light means are arranged in an array with controllable and addressable light sources which are addressed and activated discretely and the device contains a position detection and controlling system, which calculates and activates addressed light sources according to calculated eye position data, for tracking the directed light according to the position of the observer's eyes.

* * * * *